(12) United States Patent
Tanigawa et al.

(10) Patent No.: US 6,903,781 B2
(45) Date of Patent: Jun. 7, 2005

(54) VIDEO SIGNAL PROCESSING APPARATUS

(75) Inventors: Satoru Tanigawa, Kawanishi (JP);
Atsuhisa Kageyama, Ibaraki (JP);
Ryuichi Shibutani, Takatsuki (JP)

(73) Assignee: Matsushita Electric Industrial Co., Ltd. (JP)

( * ) Notice: Subject to any disclaimer, the term of this patent is extended or adjusted under 35 U.S.C. 154(b) by 547 days.

(21) Appl. No.: 10/184,053

(22) Filed: Jun. 28, 2002

(65) Prior Publication Data

US 2003/0001969 A1 Jan. 2, 2003

(30) Foreign Application Priority Data

Jun. 29, 2001 (JP) ........................................ 2001-197607

(51) Int. Cl.[7] .............................................. H04N 5/45
(52) U.S. Cl. ........................................ 348/565; 348/568
(58) Field of Search ................................. 348/565, 563, 348/564, 566, 567, 568, 584, 588, 598, 599, 705, 706, 725, 728; H04N 5/45, 5/445

(56) References Cited

U.S. PATENT DOCUMENTS

| | | | |
|---|---|---|---|
| 5,481,315 A | 1/1996 | Matsunaga | 348/565 |
| 5,715,014 A | 2/1998 | Perkins et al. | 348/565 |
| 5,754,253 A * | 5/1998 | Lee | 348/565 |
| 5,963,270 A * | 10/1999 | Hwang | 348/588 |
| 5,990,975 A | 11/1999 | Nan et al. | 348/588 |

FOREIGN PATENT DOCUMENTS

| | | |
|---|---|---|
| JP | 07115600 A | 5/1995 |
| JP | 0714137 A | 7/1995 |
| JP | 2914140 | 4/1999 |

* cited by examiner

Primary Examiner—Sherrie Hsia
(74) Attorney, Agent, or Firm—Parkhurst & Wendel, L.L.P.

(57) ABSTRACT

A video signal processing apparatus comprises a sub-screen processing integrated circuit for subjecting a sub-screen video signal to scale-down processing to reduce its display region and output the sub-screen video signal, and a main-screen processing integrated circuit comprising: a switching circuit for receiving a main-screen video signal and the scaled-down sub-screen video signal which is outputted from the sub-screen processing integrated circuit, and selecting the main-screen video signal for a main-screen display region while selecting the sub-screen video signal for a sub-screen display region; an A/D conversion circuit for converting the video signal outputted from the switching circuit into a digital video signal; a digital signal processing circuit for digitally processing the digital video signal outputted from the A/D conversion circuit; and a D/A conversion circuit for converting the digitally-processed video signal into an analog video signal. Therefore, the main-screen video signal and the sub-screen video signal can be combined so that these signals are displayed on a single screen, and the circuit scale of the video signal processing apparatus can be minimized.

9 Claims, 8 Drawing Sheets

VIDEO SIGNAL PROCESSING APPARATUS

FIELD OF THE INVENTION

The present invention relates to a video signal processing apparatus to be used when displaying plural video signals on a screen.

BACKGROUND OF THE INVENTION

In recent years, there has been an increasing opportunity to display plural input video signals simultaneously on a screen of a television receiver, and digital signal processing techniques have been employed when displaying the video signals. Further, as semiconductor processes have become more specific, large-scale circuits have been incorporated in semiconductor integrated circuits.

Figure 7:
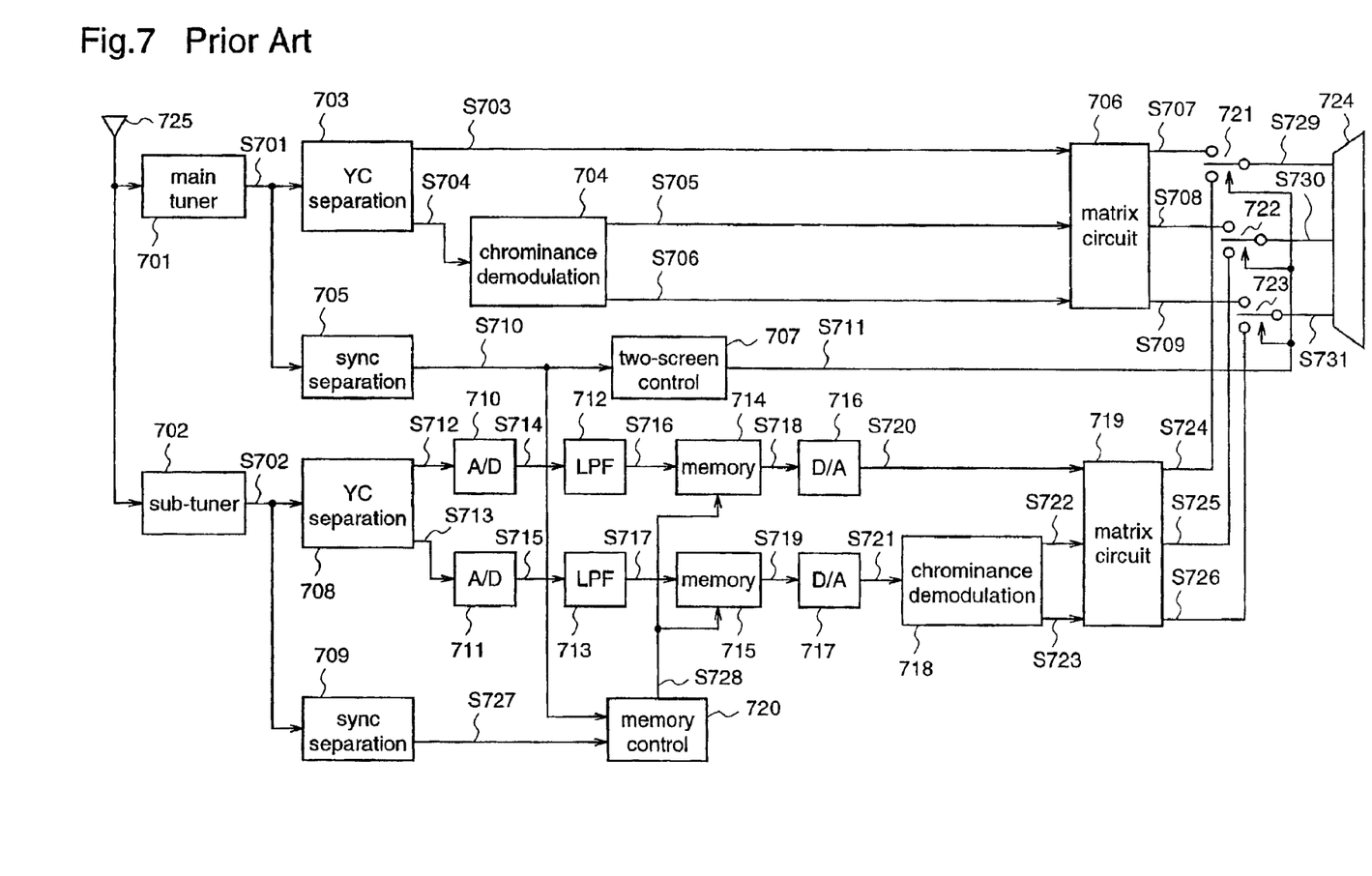
FIG. 7 is a block diagram illustrating the construction of the conventional video signal processing apparatus.

FIG. 7 is a block diagram illustrating a conventional television receiver having a function of displaying a sub-screen in a main screen, which is disclosed in Japanese Published Patent Application No. Hei.7-115600. Hereinafter, the construction and operation of the conventional television receiver will be described with reference to FIG. 7.

A main tuner 701 and a sub-tuner 702 selectively receive predetermined broadcast waves from among broadcast waves received by an antenna 725. A main-screen composite video signal S701 corresponding to the broadcast wave selected by the main tuner 701 is separated into a luminance signal S703 and a chrominance signal S704 by a YC separation circuit 703. The chrominance signal S704 is inputted to a chrominance demodulation circuit 704, and demodulated into a U signal S705 and a V signal S706 that are color-difference signals. The luminance signal S703, U signal S705, and V signal S706 are inputted to an RGB matrix circuit 706, thereby generating an R signal S707, a G signal S708, and a B signal S709 for the main screen. A synchronous separation circuit 705 separates horizontal and vertical sync signals from the main-screen composite video signal S701, and generates a reference pulse S710 of a horizontal/vertical cycle. The horizontal/vertical cycle reference pulse S710 is inputted to a two-screen control circuit 707, thereby generating a main/sub switching signal S711 that can control switches 721, 722, and 723 for selecting either a main-screen image or a sub-screen image.

On the other hand, a sub-screen composite video signal S702 corresponding to the broadcast wave selected by the sub-tuner 702 is separated into a luminance signal S712 and a chrominance signal S713 by a YC separation circuit 708. The analog luminance signal S712 is converted into a digital luminance signal S714 by an analog-to-digital converter (hereinafter referred to as "A/D converter") 710, and vertical and horizontal bands of the digital luminance signal S714 are removed by a low-pass filter 712 to avoid an occurrence of aliasing in a compression process, and thereafter, a luminance signal S716 obtained from the low-pass filter 712 is written in a memory 714. Likewise, the analog chrominance signal S713 is converted into a digital chrominance signal S715 by an A/D converter 711, and vertical and horizontal bands thereof are removed by a low-pass filter 713, and thereafter, a chrominance signal S717 outputted from the low-pass filter 713 is written in a memory 715. A synchronous separation circuit 709 separates horizontal and vertical sync signals from the main-screen composite video signal S702, and generates a reference pulse S727 of a horizontal/vertical cycle. A memory control circuit 720 controls the writing operation into the memory 715 on the basis of the reference pulse S727, and controls the reading operation from the memory 715 on the basis of the reference pulse S710. The digital luminance signal S718 read from the memory 714 is converted into an analog luminance signal S720 by a digital-to-analog converter (hereinafter referred to as "D/A converter") 716. The digital chrominance signal S719 read from the memory 715 is converted into an analog chrominance signal S721 by a D/A converter 717, and the analog chrominance signal S721 is demodulated to a U signal S722 and a V signal S723 as color-difference signals by a chrominance demodulation circuit 718. The luminance signal S720, U signal S722, and V signal S723 are inputted to an RGB matrix circuit 719, wherein an R signal S724, a G signal S725, and a B signal S726 for the sub-screen are generated. Either the R signal S707, G signal S708, and B signal S709 for the main screen, or the R signal S724, G signal S725, and B signal S726 for the sub-screen are selected by the main/sub switching signal S711 so that the sub-screen is displayed in a predetermined area of the main screen, and consequently, a composite R signal S729, a composite G signal S730, and a composite B signal S731 are outputted to a monitor 724.

However, the conventional television receiver requires, for the main screen, the YC separation circuit 703, the synchronous separation circuit 705, the chrominance demodulation circuit 704, and the matrix circuit 706, which circuits perform analog processing, and further, it requires, for the sub-screen, the YC separation circuit 708, the synchronous separation circuit 709, the chrominance demodulation circuit 718, and the matrix circuit 719, which circuits perform analog processing, as well as the filters 712 and 713 and the memories 714 and 715 as semiconductor components for digital processing. Thus, the conventional television receiver requires many semiconductor components for signal processing, whereby the number of peripheral circuits also increases, resulting in an increased circuit scale.

Furthermore, since the conventional television receiver employs a lot of analog processing circuits whose characteristics such as temperature characteristics easily vary, the characteristics of the whole products easily vary, and it is difficult to adjust the variations in manufacture factories.

Furthermore, it might be desirable, for commercialization, that the signal processing circuit for the main screen is constituted as a versatile circuit that is independent of the signal processing circuit for the sub-screen and is also applicable to a television receiver which inserts no sub-screen in the main-screen. However, when the signal processing circuit for the main screen and the signal processing circuit for the sub-screen are fabricated as independent integrated circuits, even if these integrated circuits have sharable components, it is difficult to constitute the both circuits so as to share the components. As a result, it is difficult to reduce the circuit scale of the whole video signal processing apparatus by sharing the components.

SUMMARY OF THE INVENTION

The present invention is made to solve the above-mentioned problems and has for its object to provide a video signal processing apparatus that can combine a video signal for a main screen and a video signal for a sub-screen so that these signals are displayed on a single screen, and that can minimize the circuit scale.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a video signal processing apparatus comprises: a sub-screen processing integrated circuit for receiving a video signal for a sub-screen, and subjecting the sub-screen video signal to scale-down processing to reduce its display region and output the scaled-down sub-screen video signal; and a main-screen processing integrated circuit which includes a switching means for receiving a video signal for a main-screen and the scaled-down sub-screen video signal which is outputted from the sub-screen processing integrated circuit, and selecting the main-screen video signal for a main-screen display region while selecting the scaled-down sub-screen video signal for a sub-screen display region; an analog-to-digital conversion means for converting the video signal which is outputted from the switching means, into a digital video signal; a digital signal processing means for digitally processing the digital video signal which is outputted from the analog-to-digital conversion means; and a digital-to-analog conversion means for converting the digitally-processed video signal into an analog video signal. Therefore, the main-screen video signal and the sub-screen video signal can be combined so that these signals are displayed on a single screen, by inputting the sub-screen video signal outputted from the sub-screen processing integrated circuit to the main-screen processing integrated circuit, and furthermore, the circuit scale can be reduced by digitizing the integrated circuits while minimizing the number of required terminals, thereby providing a minimized-scale video signal processing apparatus having an integrated circuit for processing the main-screen video signal and an integrated circuit for processing the sub-screen video signal.

According to a second aspect of the present invention, in the video signal processing apparatus according to the first aspect, the digital signal processing means includes a border insertion means for inserting a border line of a predetermined width at the boundary of the main-screen display region and the sub-screen display region. Therefore, image disordering due to an arithmetic error in the main-screen video signal at the boundary of the main screen and the sub-screen is resolved, thereby avoiding degradation in image quality.

According to a third aspect of the present invention, in the video signal processing apparatus according to the second aspect, the border insertion means inserts the border line in accordance with a control signal for controlling the switching means. Therefore, image disordering due to an arithmetic error in the main-screen video signal at the boundary of the main screen and the sub-screen is resolved, thereby avoiding degradation in image quality.

According to a fourth aspect of the present invention, in the video signal processing apparatus according to the first aspect, the main-screen video signal is inputted to an S terminal, with a luminance signal and a chrominance signal thereof being inputted to the S terminal separately. Therefore, the main-screen video signal inputted to the S terminal and the sub-screen video signal can be combined so that these signals are displayed on a single screen, by inputting the sub-screen video signal outputted from the sub-screen processing integrated circuit to the main-screen processing integrated circuit, and furthermore, the circuit scale can be reduced by digitizing the integrated circuits while minimizing the number of required terminals, thereby providing a minimized-scale video signal processing apparatus having an integrated circuit for processing the main-screen video signal inputted to the S terminal, and an integrated circuit for processing the sub-screen video signal.

According to a fifth aspect of the present invention, in the video signal processing apparatus according to the first aspect, signals to be inputted to the main-screen processing integrated circuit are three component video signals comprising a luminance signal and two color-difference signals, respectively. Therefore, the main-screen video signal as a component video signal and the sub-screen video signal can be combined so that these signals are displayed on a single screen, by inputting the sub-screen video signal outputted from the sub-screen processing integrated circuit to the main-screen processing integrated circuit, and furthermore, the circuit scale can be reduced by digitizing the integrated circuits while minimizing the number of required terminals, thereby providing a minimized-scale video signal processing apparatus having an integrated circuit for processing the main-screen video signal as a component video signal, and an integrated circuit for processing the sub-screen video signal.

According to a sixth aspect of the present invention, in the video signal processing apparatus according to the first aspect, the digital signal processing means includes an image-quality adjustment means for performing image processing on the inputted digital video signal. Therefore, a higher-quality image can be obtained.

According to a seventh aspect of the present invention, in the video signal processing apparatus according to the first aspect, the sub-screen processing integrated circuit further includes a delay difference control means for delaying color-difference signals of the sub-screen video signal with respect to a luminance signal of the sub-screen video signal, and outputting these signals to the main-screen processing integrated circuit. Therefore, a deviation of a reference line at the change point between the main-screen and the sub-screen is avoided.

According to an eighth aspect of the present invention, in the video signal processing apparatus according to the seventh aspect, in the main-screen processing integrated circuit, the digital signal processing means includes a YC separation means for performing, using a line memory, YC separation on video data of a target line to be processed, by arithmetic operation on the basis of the target line outputted from the analog digital conversion means and two lines before and after the target line; and the delay difference control means delays the color-difference signals of the sub-screen video signal by one line period with respect to the sub-screen luminance signal, in accordance with a delay of one line that occurs in the YC separation means. Therefore, a deviation of a reference line at the change point between the main-screen and the sub-screen is avoided.

According to a ninth aspect of the present invention, a video signal processing apparatus comprises: a sub-screen processing integrated circuit for receiving a video signal for a sub-screen, and subjecting the sub-screen video signal to scale-down processing to reduce its display region and output the scaled-down sub-screen video signal; and a main-screen processing integrated circuit which includes: a switching means for receiving a video signal for a main-screen and the scaled-down sub-screen video signal which is outputted from the sub-screen processing integrated circuit, and selecting the main-screen video signal for a main-screen display region while selecting the scaled-down sub-screen video signal for a sub-screen display region; and a border insertion means for receiving the output from the switching means, and inserting a border line of a predetermined width at the boundary of the main-screen display region and the sub-screen display region. Therefore, image disordering due to an arithmetic error in the main-screen video signal at the boundary of the main screen and the sub-screen is resolved, thereby avoiding degradation in image quality.

DETAILED DESCRIPTION OF THE PREFERRED EMBODIMENTS

[Embodiment 1]

Figure 1:
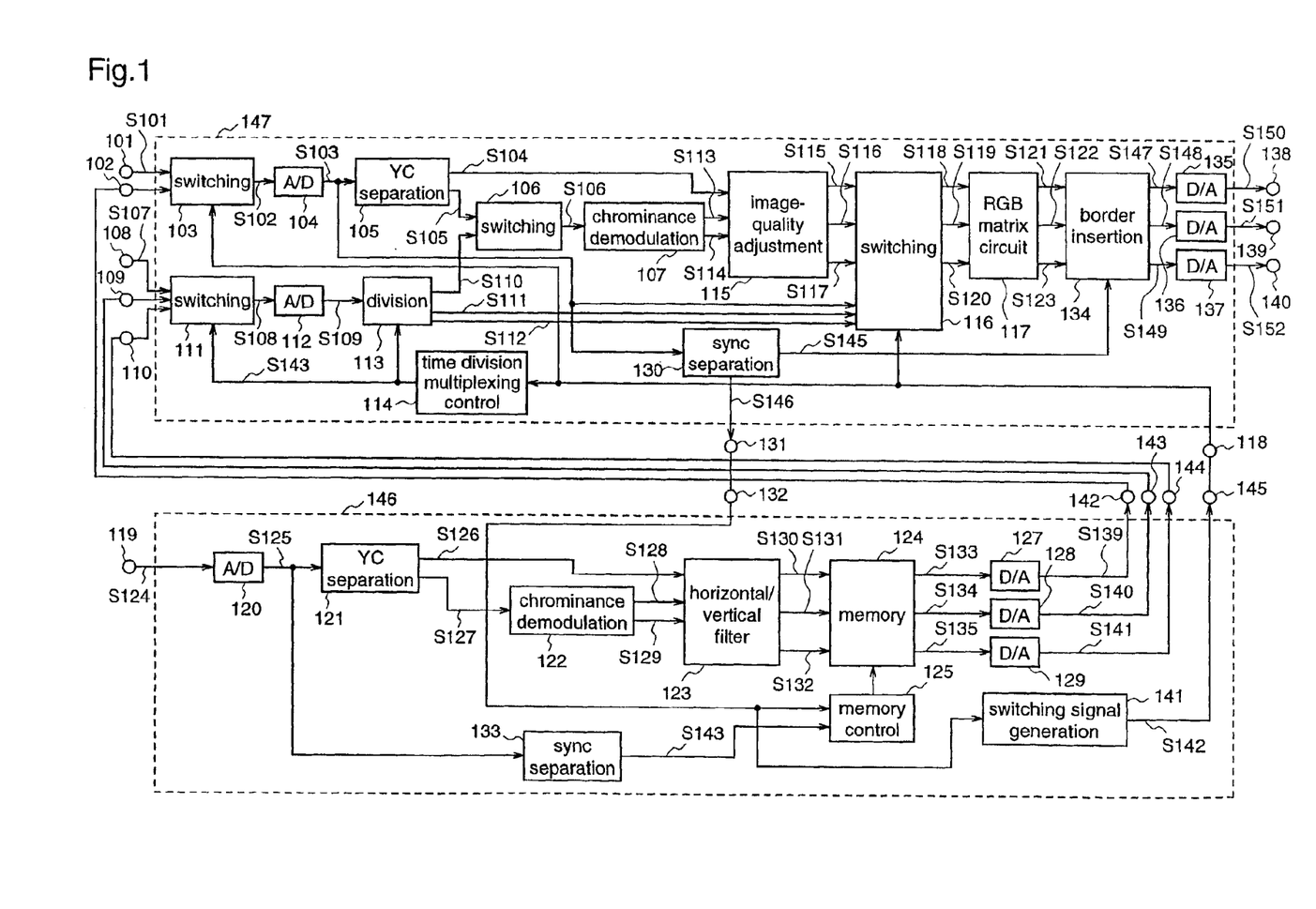
FIG. 1 is a block diagram illustrating the construction of a video signal processing apparatus according to a first embodiment of the present invention.

FIG. 1 is a block diagram illustrating the construction of a video signal processing apparatus according to a first embodiment of the present invention. The video signal processing apparatus is provided with a main-screen signal processing circuit 147, and a sub-screen signal processing circuit 146. The main-screen signal processing circuit 147 and the sub-screen signal processing circuit 146 are integrated circuits which are independent from each other.

In the sub-screen signal processing circuit 146, an A/D converter 120 converts a sub-screen analog video signal S124, which is inputted from an input terminal 119, into a digital video signal S125, and outputs the digital video signal S125 to a synchronous separation circuit 133 and to a YC separation circuit 121. The synchronous separation circuit 133 separates a horizontal sync signal and a vertical sync signal from the digital video signal S125, and generates a horizontal/vertical reference pulse S143 that is synchronized with the sub-screen input signal. The YC separation circuit 121 separates a luminance signal S126 and a chrominance signal S127 from the digital video signal S125. A chrominance demodulation circuit 122 demodulates the inputted chrominance signal S127 into a U signal S128 and a V signal S129, which are color-difference signals. A horizontal/vertical filter 123 compresses the luminance signal S126, U signal S128, and V signal S129, which are supplied from the YC separation circuit 121 and the chrominance demodulation circuit 122, in the horizontal direction and the vertical direction to generate a luminance signal S130, a U signal S131, and a V signal S132, and then writes the generated signals into a memory 124. A memory control circuit 125 controls the timing to write data in the memory 124 according to the horizontal/vertical reference pulse S143 that is synchronized with the sub-screen input, and controls the timing to read data from the memory 124 according to the horizontal/vertical reference pulse S146 that is synchronized with the main-screen input. D/A converters 127, 128, and 129 convert the digital luminance signal S133, U signal S134, and V signal S135 into analog signals, respectively. A sub-screen luminance output signal S139, a sub-screen U output signal S140, and a sub-screen V output signal S141, which are obtained by the above-mentioned D/A conversion, are outputted from an output terminal 142, an output terminal 143, and an output terminal 144, respectively. A switching signal generation circuit 141 generates a main/sub switching signal S142 which indicates an area where the sub-screen signal is effective, on the basis of the horizontal/vertical reference pulse S146 synchronized with the main-screen input, and outputs the signal S142 from an output terminal 145.

On the other hand, in the main-screen signal processing circuit 147, an input terminal 101 is supplied with a main-screen composite video signal S101 or a luminance signal S101 inputted to an S terminal, and an input terminal 102 is supplied with the sub-screen luminance output signal S139. A switching circuit 103 selects either the main-screen composite video signal (or the S terminal-inputted luminance signal) S101 or the sub-screen luminance output signal S139 according to the main/sub switching signal S142, and outputs the selected signal. For example, the sub-screen luminance output signal S139 is outputted as a composite luminance signal S102 when the main/sub switching signal S142 is "High", and the main-screen composite video signal S101 is outputted as a composite luminance signal S102 when the main/sub switching signal S142 is "Low". Thereby, the main-screen composite video signal S101 is outputted in the area where the main screen is displayed, and the sub-screen luminance output signal S139 is outputted in the area where the sub-screen is displayed. An A/D converter 104 converts the analog composite luminance signal S102 into a digital composite video signal S103. A synchronous separation circuit 130 separates a horizontal sync signal and a vertical sync signal from the composite video signal S103, and generates horizontal/vertical reference pulses S145 and S146 which are synchronized with the main-screen input signal. A YC separation circuit 105 separates a main-screen luminance signal S104 and a main-screen chrominance signal S105 from the composite video signal S103. In order to improve the image quality, the YC separation circuit 105 employed for the first embodiment is provided with a so-called line comb filter (not shown) having a first line memory (not shown) for holding one line of the inputted composite video signal S103 for one line period, and a second line memory (not shown) for holding the one line of video signal outputted from the first line memory, for one line period. The YC separation circuit 105 performs YC separation of the one line of video signal outputted from the first line memory, by an arithmetic operation based on the correlation between the video signal outputted from the first line memory, and the video signal outputted from the second line memory (i.e., the video signal that is one line before the line outputted from the first line memory), and the correlation between the video signal outputted from the first line memory, and the video signal inputted to the first line memory (i.e., the video signal that is one line after the line outputted from the first line memory). That is, YC separation from the video signal of the target line is carried out by an arithmetic operation based on the correlation between the video signal of the target line and the video signals of two lines before and after the target line. Therefore, the luminance signal and the chrominance signal obtained by this YC separation are always delayed by one line period with respect to the inputted video signal. A switching circuit 106 selects the chrominance signal S105 outputted from the YC separation circuit 105 when the main-screen input signal is the composite video signal, and selects the chrominance signal S110 outputted from a division circuit 113 (described later) when the main-screen input signal is the S-terminal-inputted luminance signal, and outputs the selected signal. A chrominance demodulation circuit 107 demodulates the chrominance signal S106 outputted from the switching circuit 106 to a U signal S113 and a V signal S114 which are color-difference signals. An image quality adjustment circuit 115 subjects the luminance signal S104, U signal S113, and V signal S114 to digital image processing for adjusting the image quality. For example, this digital image processing may be outline correction for enhancing an outline portion in the image. Thereby, image-quality-adjusted luminance signal S115, U signal S116, and V signal S117 are obtained.

An input terminal 108 is supplied with an S-terminal-inputted chrominance signal S107 for the main-screen, an input terminal 109 is supplied with the sub-screen U output signal S140, and an input terminal 110 is supplied with the sub-screen V output signal S141. A time-division multiplexing control circuit 114 generates a multiplexing switching signal S143 on the basis of the main/sub switching signal S142. A switching circuit 111 selects one input from among the input terminals 108~110 on the basis of the multiplexing switching signal S143, and outputs it as a composite video signal S108. For example, the switching circuit 111 selects the S-terminal-inputted chrominance signal S107 when the multiplexing switching signal S143 is "0", selects the sub-screen U output signal S140 when the signal S143 is "1", and selects the sub-screen V output signal S141 when the signal S143 is "2". An A/D converter 112 converts the analog composite video signal S108 into a digital composite video signal S109. A division circuit 113 divides the composite video signal S109 into an S-terminal-inputted chrominance signal S110, a sub-screen U signal S111, and a sub-screen V signal S112.

In the period during which the main screen is displayed, a main/sub switching circuit 116 extracts the luminance signal corresponding to the main screen from the luminance signal S115 obtained from the image-quality adjustment circuit 115 on the basis of the main/sub switching signal S142, and outputs the extracted luminance signal, the U signal S116, and the V signal S117 as a luminance signal S118, a U signal S119, and a V signal S120, respectively. Further, in the period during which the sub-screen is displayed, the main/sub switching circuit 116 extracts the sub-screen luminance signal from the video signal S103 outputted from the A/D converter 104, and outputs the extracted luminance signal, the U signal S111, and the V signal S112 as a luminance signal S118, a U signal S119, and a V signal S120, respectively. By switching the input signal in this way, the luminance signal S118, U signal S119, and V signal S120, in which the sub-screen video signal is inserted in the main-screen video signal, are outputted. An RGB matrix circuit 117 converts the luminance signal S118, U signal S119, and V signal S120 into R, G, B signals, thereby outputting an R signal S121, a G signal S122, and a B signal S123. A border insertion circuit 134 inserts a signal for drawing a border line of a predetermined width on a boundary line between the main-screen image and the sub-screen image, into the R signal S121, G signal S122, and B signal S123, on the basis of the sync signal S145 outputted from the synchronous separation circuit 130. D/A converters 135, 136, and 137 convert the border-line-inserted analog R, G, and B signals S147, S148, and S149 which are outputted from the border insertion circuit 134, into analog signals, and outputs an R output signal S150, a G output signal S151, and a B output signal S152 from an output terminal 138, an output terminal 139, and an output terminal 140, respectively.

Figure 3:
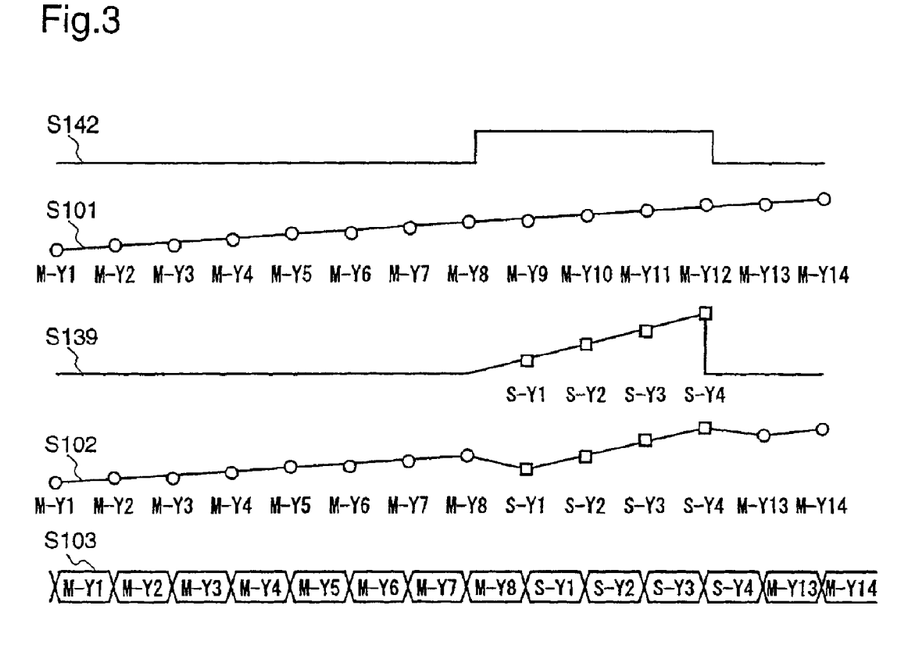
FIG. 3 is a timing chart of a luminance signal before and after time-division multiplexing by the video signal processing apparatus according to the first embodiment.

FIG. 3 is a timing chart for explaining an example of operation of the video signal processing apparatus according to the first embodiment in the case where the main-screen video signal S101 and the sub-screen luminance signal S139 outputted from the sub-screen signal processing circuit 146 are time-division-multiplexed and inputted to the A/D converter. In FIG. 3, S142 denotes a main/sub switching signal, S101 denotes a main-screen composite video signal input or an S-terminal-inputted luminance signal, S139 denotes a sub-screen luminance signal output, S102 denotes a time-division-multiplexed video signal, and S103 denotes an A/D converted digital video signal. In FIG. 3, circles and rectangles indicate sampling points, M-Y indicates the luminance signal of the main-screen video signal, S-Y indicates the luminance signal of the sub-screen video signal, and a numeral that follows Y indicates each sampling point.

Figure 4:
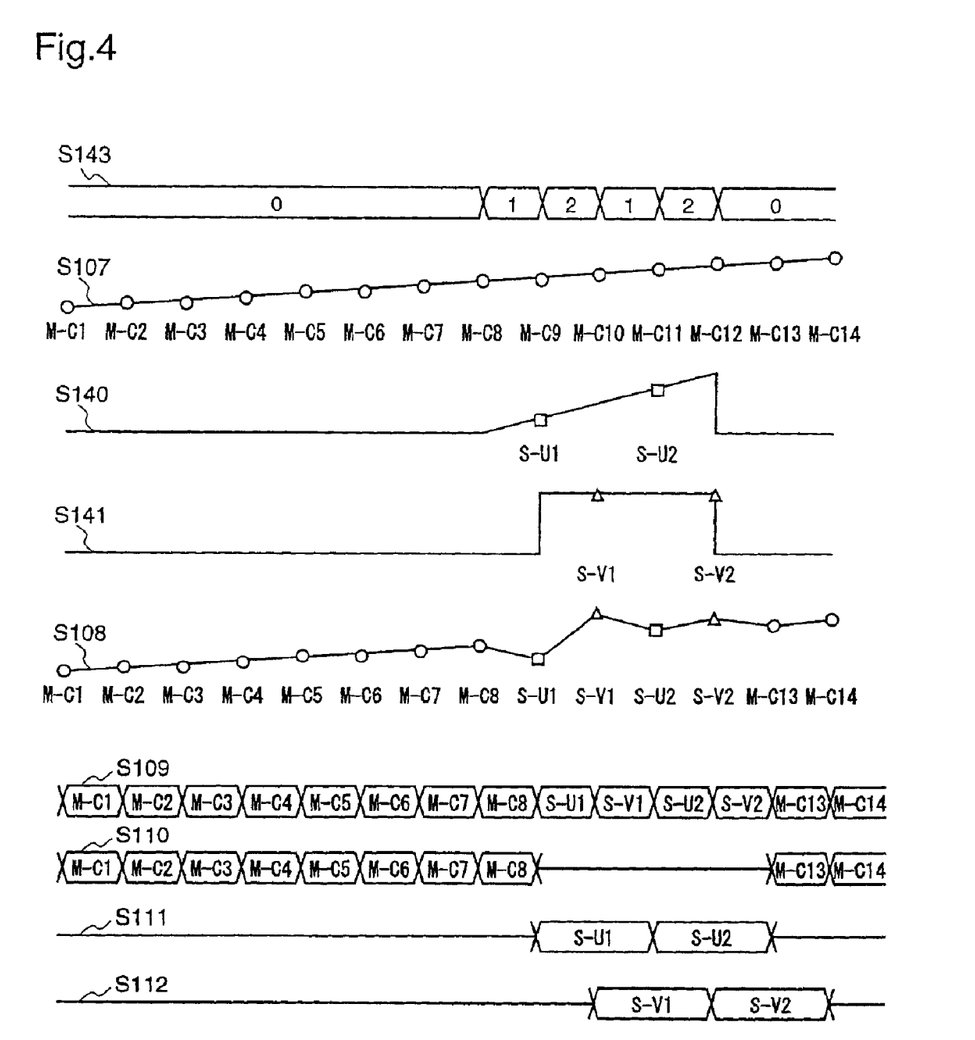
FIG. 4 is a timing chart of a chrominance signal before and after time-division multiplexing by the video signal processing apparatus according to the first embodiment.

FIG. 4 is a timing chart for explaining an example of operation of the video signal processing apparatus according to the first embodiment in the case where the main-screen video signal S107 and the sub-screen color-difference signals S140 and S141 outputted from the sub-screen signal processing circuit 146 are time-division-multiplexed and inputted to the A/D converter. In FIG. 4, S143 denotes a switching signal for multiplexing the color-difference signals, S107 denotes a main-screen chrominance signal input, S140 is a sub-screen U signal output, S141 denotes sub-screen V signal output, S108 denotes a time-division-multiplexed video signal, S109 denotes an A/D converted digital video signal, S110 denotes a separated main-screen chrominance signal, S111 denotes a separated sub-screen U signal, S112 denotes a separated sub-screen V signal. In FIG. 4, circles, triangles, and rectangles indicate sampling points, M-C indicates the chrominance signal of the main-screen video signal, S-U indicates the U signal output of the sub-screen video signal, S-V indicates the V signal output of the sub-screen video signal, and numerals that follow C, U, and V indicate the respective sampling points. Since the sub-screen U signal output S140 and the sub-screen V signal output S141 are subjected to sampling by the same A/D converter 112, the sampling points of the signal S140 and the sampling points of the signal S141 are alternately arranged.

Figure 5:
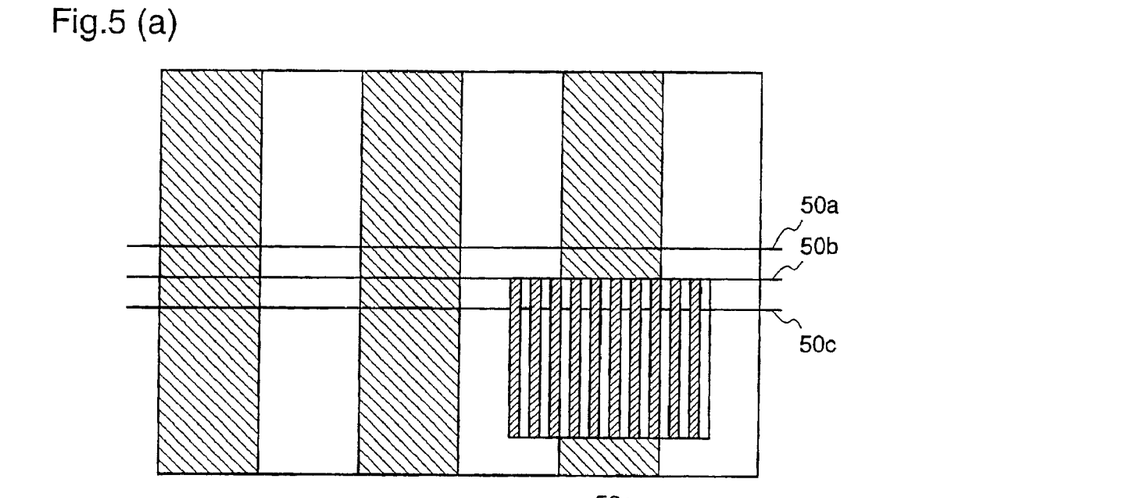
FIGS. 5(a) and 5(b) are diagrams illustrating a video signal waveform which indicates an input waveform at the boundary of a main screen and a sub-screen, for explaining the video signal processing apparatus according to the first embodiment.

FIGS. 5(a) and 5(b) are diagrams for explaining the video signal processing apparatus according to the first embodiment and, specifically, FIG. 5(a) shows an example of a display in which a sub-screen image is inserted in a main-screen image, and FIG. 5(b) shows video signals corresponding to the display. In these figures, 50a denotes a video signal waveform that scans the main-screen video signal, 50b denotes a video signal waveform that scans the boundary of the sub-screen image and the main-screen image, 50c denotes a video signal waveform that scans the sub-screen image, 50b' denotes a video signal waveform that is obtained by an arithmetic operation based on the correlation between the upper and lower lines with respect to the scanning position 50b, 50b" denotes a video signal waveform that is obtained when black is inserted as a border line on the boundary line between the main-screen image and the sub-screen image, i.e., along the scanning position of 50b, and 50s denotes a portion where an arithmetic error occurs in the correlation between the upper and lower lines. To simplify the description, both of the main-screen image and the sub-screen image are images of vertical stripe patterns. Further, as an arithmetic operation for obtaining the video signal waveform 50b', a value having the highest frequency among the values of the video signal waveforms 50a~50c is obtained as a value of the video signal waveform 50b'. For example, in a position where the values of the video signal waveforms 50a and 50b are "H" and the value of the video signal waveform 50c is "L", the value of the video signal waveform 50b' obtained by the arithmetic operation becomes "H".

Next, the operation of the video signal processing apparatus according to the first embodiment will be described. The sub-screen analog video signal S124 that is inputted from the input terminal 119 is converted into a digital video signal S125 by the A/D converter 120, and the digital video signal S125 is inputted to the synchronous separation circuit 133 and to the YC separation circuit 121. Further, a horizontal sync signal and a vertical sync signal are separated from the digital video signal S125 inputted to the synchronous separation circuit 133, and a horizontal/vertical reference pulse S143 synchronized with the sub-screen input signal is generated. Then, a luminance signal S126 and a chrominance signal S127 are separated from the digital video signal S125 inputted to the YC separation circuit 121. The chrominance signal S127 is inputted to the chrominance demodulation circuit 122 to be demodulated to a U signal S128 and a V signal S129 which are color-difference signals. The luminance signal S126, U signal S128, and V signal S129 are inputted to the horizontal/vertical filter 123 to be compressed in the horizontal direction and the vertical direction, and a luminance signal S130, a U signal S131, and a V signal S132 which are obtained by the compression are written in the memory 124. The memory control circuit 125 controls the timing to write data into the memory 124 on the basis of the horizontal/vertical reference pulse S143 that is synchronized with the sub-screen input. Further, the memory control circuit 125 controls the timing to read data from the memory 124 on the basis of the horizontal/vertical reference pulse S146 that is synchronized with the main-screen input, whereby a luminance signal S133, a U signal S134, and a V signal S135 are read from the memory 124. These digital signals S133, S134, and S135 are converted into analog signals by the D/A converters 127, 128, and 129, respectively, whereby a sub-screen luminance output signal S139, a sub-screen U output signal S140, and a sub-screen V output signal 141 are outputted from the output terminals 142, 143, and 144, respectively. The switching signal generation circuit 141 generates a main/sub switching signal S142 indicating a region where the sub-screen video signal is effective, on the basis of the horizontal/vertical reference pulse S146 that is synchronized with the main-screen input, and outputs this signal from the output terminal 145.

The input terminal 101 is supplied with the main-screen composite video signal or the S-terminal-inputted luminance signal S101, and the input terminal 102 is supplied with the sub-screen luminance output signal S139. The switching circuit 103 selects either the luminance signal S101 or the sub-screen luminance output signal S139 on the basis of the main/sub switching signal S142, and outputs the selected signal. For example, as shown in FIG. 3, when the main/sub switching signal S142 of "High" level is outputted during the period in which the sub-screen luminance output signal S139 is supplied, the switching circuit 103 outputs the sub-screen luminance output signal S139 as a composite luminance signal S102 when the sub-screen video signal is inputted, and outputs the main-screen composite video signal S101 as a composite luminance signal S102 when the sub-screen signal is not inputted. The analog composite luminance signal S102 is converted into a digital composite video signal S103 by the A/D converter 104, and the digital composite video signal S103 is inputted to the synchronous separation circuit 130, the YC separation circuit 105, and the main/sub switching circuit 116. In the synchronous separation circuit 130, horizontal and vertical sync signals are separated from the composite video signal S103, and horizontal/vertical reference pluses S145 and S146 which are synchronized with the main-screen input signal are generated. In the YC separation circuit 105, the main-screen luminance signal S104 and the main-screen chrominance signal S105 are separated from the composite video signal S103. In this first embodiment, since the YC separation circuit 105 is provided with the line comb filter, YC separation of each line (target line) is carried out by an arithmetic operation based on the correlation between three lines including the target line and the lines before and after the target line. Further, the output from the YC separation circuit 105 is always delayed by one line period with respect to the video signal inputted to the YC separation circuit 105. The switching circuit 106 selectively outputs the chrominance signal S105 that is outputted from the YC separation circuit 105 when the main-screen input signal is the composite video signal, and it selectively outputs the chrominance signal S110 that is outputted from the division circuit 113 when the main-screen input signal is the S-terminal-inputted luminance signal. The chrominance signal S106 is inputted to the chrominance demodulation circuit 107 to be demodulated into a U signal S113 and a V signal S114 which are color-difference signals. The luminance signal S104, U signal S113, and V signal S114 are inputted to the image-quality adjustment circuit 115. The image-quality adjustment circuit 115 performs digital image processing for image-quality adjustment. An example of this image processing is outline correction for enhancing an outline portion in the image, thereby obtaining a luminance signal S115, a U signal S116, and a V signal S117, the image qualities of which are enhanced.

The input terminal 108 is supplied with the S-terminal-inputted chrominance signal S107 for the main screen, the input terminal 109 is supplied with the sub-screen U output signal S140, and the input terminal 110 is supplied with the sub-screen V output signal S141. The time-division multiplexing control circuit 114 generates a multiplexing switching signal S143 on the basis of the main/sub switching signal S142. The switching circuit 111 selects one of the S-terminal-inputted chrominance signal S107, the sub-screen U output signal S140, and the sub-screen V output signal S141, on the basis of the multiplexing switching signal S143, and outputs the selected signal as a composite video signal S108. For example, the switching means 111 selects the S-terminal-inputted chrominance signal S107 when the multiplexing switching signal S143 is "0", the sub-screen U output signal S140 when the multiplexing switching signal S143 is "1", or the sub-screen V output signal S141 when the multiplexing switching signal S143 is "2", and outputs the selected signal as an analog composite video signal S108. The analog composite video signal S108 is converted into a digital composite video signal S109 by the A/D converter 112. Then, the division circuit 113 divides the composite video signal S109 into an S-terminal-inputted chrominance signal S110, a sub-screen U signal S111, and a sub-screen V signal S112. The main/sub switching circuit 116 selects, on the basis of the main/sub switching signal S142, either the main-screen luminance signal in the luminance signal S115, U signal S116, and V signal S117, or the sub-screen luminance signal in the video signal S103 outputted from the A/D converter 104, U signal S111, and V signal S112, thereby obtaining a luminance signal S118, a U signal S119, and a V signal S120, in which the sub-screen signal is inserted in the main-screen signal. The luminance signal S118, the U signal S119, and the V signal S120 are converted into R, G, and B signals by the RGB matrix circuit 117, and an R signal S121, a G signal S122, and a B signal S123 are outputted to the border insertion circuit 134.

Turning to FIG. 5(a), there is no correlation of video between the upper and lower lines at the boundary of the main-screen video signal and the sub-screen video signal because the sub-screen is inserted by the main/sub switching. In the YC separation circuit 105 for the main screen, YC separation is carried out by using the line comb filter while observing the correction of video between the upper and lower lines of the target line to be subjected to YC separation. However, since there is no correlation between the main-screen video signal and the sub-screen video signal at the boundary of the main screen and the sub-screen, if an arithmetic operation for YC separation at the scanning position of the video signal waveform 50b is carried out on the basis of the correlation between the video signal waveform 50a, the video signal waveform 50b, and the video signal waveform 50c as shown in FIG. 5(b), an arithmetic error may occur at the point of 50S as shown by the video signal waveform 50b', and a satisfactory image cannot be obtained. In this first embodiment, however, the border insertion circuit 134 forms a new border line of a predetermined width, and inserts the border line in the position of the boundary of the main screen and the sub-screen according to the horizontal/vertical sync reference pulse S145. Therefore, even when an arithmetic error occurs at the boundary of the main screen and the sub-screen and the image at the boundary is disordered, the border line is drawn on the boundary where the image disordering occurs, as shown by the video signal waveform 50b', thereby obtaining an R signal S147, a G signal S148, and a B signal S149, which signals provide a satisfactory image in which the image disordering at the boundary is hidden, i.e., the image disordering is resolved. The R signal S147, G signal S148, and B signal S149, which are digital signals, are converted into analog signals by the D/A converters 135, 136, and 137, respectively, and an R output signal S150, a G output signal S151, and a B output signal S152 are outputted from the output terminals 138, 139, and 140, respectively.

In the video signal processing apparatus according to the first embodiment, since the video signal inputted to the sub-screen signal processing circuit 146 and the video signal inputted to the main-screen signal processing circuit 147 are converted from analog to digital and then subjected to digital signal processing in the respective circuits, the respective circuits can be constituted as two integrated circuits that are independent from each other, while making the components of these circuits sharable. Further, variations in temperature characteristics or the like of the whole circuit are removed, whereby adjustments to products in factories are dispensed with or simplified.

Further, the switching circuit 103 selects either the composite video signal that is inputted for the main screen (or the luminance signal of the S-terminal-inputted video signal) or the output signal from the sub-screen signal processing circuit 146, the signal selected by the switching circuit 103 is digitized by the A/D converter 104, and conversion into the R, G, B signals by the RGB matrix circuit 117 is carried out by digital processing. Therefore, the RGB matrix circuit 117 of the main-screen signal processing circuit can be used for digital processing of the sub-screen video signal, and an RGB matrix circuit for processing the sub-screen video signal is dispensed with, thereby suppressing an increase in the circuit scale. Further, since the video signal inputted for the main screen and the output signal from the sub-screen signal processing circuit are time-division-multiplexed while switching these signals by the switching circuit 103, the A/D converter 104 for the main-screen input signal can be shared between the main-screen input signal and the sub-screen input signal. Therefore, it is not necessary for the main-screen signal processing circuit 147 to have an A/D converter dedicated to the sub-screen input signal, thereby avoiding an increase in the circuit scale.

Furthermore, when the sub-screen signal processing circuit 146 and the main-screen signal processing circuit 147 are digitally connected to each other at the interface between these circuits, the number of I/O terminals (i.e., the number of pins of the integrated circuit) is undesirably increased, resulting in complicated construction and increased circuit scale. In this first embodiment, however, since connection of the sub-screen signal processing circuit 146 and the main-screen signal processing circuit 147 is analog connection, the terminals required for the sub-screen signal input are only input ports for the analog Y, U, and V signals, whereby an increase in the number of terminals is minimized, resulting in reduced circuit scale.

Furthermore, since the border insertion circuit 134 inserts a border line in the position of the boundary of the main screen and the sub-screen, image disordering due to an arithmetic error of the main-screen video signal at the boundary can be hidden with the border line, whereby degradation in image quality is avoided.

While in this first embodiment the video signal processing apparatus is provided with the image quality adjustment circuit 115 which performs digital video processing for image-quality adjustment, the apparatus may be provided with a digital processing circuit which performs digital processing other than image-quality adjustment. Also in this case, the same effects as described for the first embodiment can be achieved. Further, such digital processing circuit may be provided between the switching circuit 116 and the RGB matrix circuit 117 so as to perform digital processing on the luminance signals and color-difference signals of the main screen and the sub-screen. Also in this case, the same effects as described for the first embodiment can be achieved. Moreover, in addition to the image-quality adjustment circuit 115, another image-quality adjustment circuit may be provided between the A/D converter 104 and the switching circuit 116, or between the division circuit 113 and the switching circuit 116.

Further, while in this first embodiment insertion of a border line by the border insertion circuit 134 is controlled on the basis of the horizontal/vertical reference pulse S145 that is outputted from the synchronous separation circuit 130, a change point between the main screen and the sub-screen may be detected on the basis of the main/sub switching circuit S142, and a border line may be inserted in the position of the detected change point.

Moreover, while in this first embodiment two A/D converters are shared by the main-screen video signal and the sub-screen video signal, even when the number of A/D converters to be utilized for digitization of the main-screen video signal is one or more than two, the A/D converter (A/D converters) can be shared by switching the video signal between the main-screen video signal input and the sub-screen video signal output.

[Embodiment 2]

Figure 8:
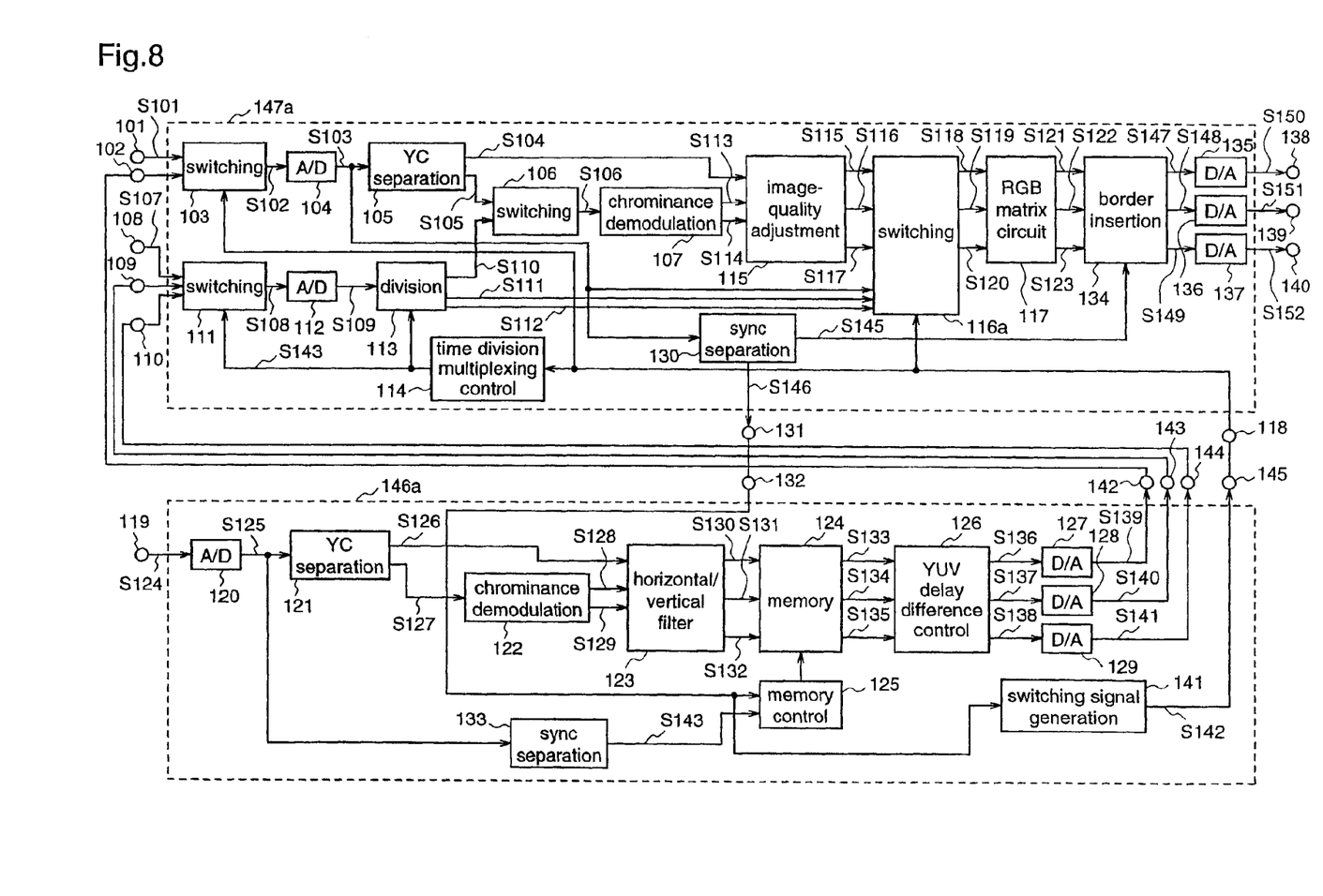
FIG. 8 is a block diagram illustrating the construction of a video signal processing apparatus according to a second embodiment of the present invention.

FIG. 8 is a block diagram illustrating the construction of a video signal processing apparatus according to a second embodiment of the present invention. The video signal processing apparatus according to the second embodiment is fundamentally identical to the video signal processing apparatus according to the first embodiment except that the main/sub switching circuit extracts a sub-screen luminance signal as well as a main-screen luminance signal from a luminance signal outputted from the image-quality adjustment circuit, so that the sub-screen luminance signal can also be subjected to image-quality adjustment by the image-quality adjustment circuit.

In FIG. 8, the same reference numerals as those shown in FIG. 1 denote the same or corresponding parts. A YUV delay difference control circuit 126 included in a sub-screen signal processing circuit 146a reads a luminance signal S133, a U signal S134, and a V signal S135 from the memory 124, and delays the U signal S134 and the V signal S135 by one horizontal period with respect to the luminance signal S133, thereby generating a U signal S137 and a V signal S138, each having a delay difference of one horizontal period with respect to a luminance signal S136. Although the U signal S134 and the V signal S135 are delayed by one horizontal period with respect to the luminance signal S136 by the YUV delay difference control circuit 126, these signals S134 and S135 may be delayed by one horizontal period with respect to the luminance signal S136 by setting a difference in read timings of the U signal S134 and the V signal S135 from the memory 124 by the memory control circuit 125, without providing the YUV delay difference control circuit 126. The D/A converters 127, 128, and 129 convert the digital luminance signal S136, U signal S137, and V signal S138 into analog signals. A main/sub switching circuit 116a included in the main-screen signal processing circuit 147a receives a luminance signal S115, a U signal S116, and a V signal S117 which are outputted from the image-quality adjustment circuit 115, and a U signal S111 and a V signal S112 which are outputted from the division circuit 113. In the period during which the main screen is displayed, the main/sub switching circuit 116a extracts the luminance signal S115 corresponding to the main screen from the image-quality adjustment circuit 115 on the basis of the main/sub switching signal S142, and outputs the extracted luminance signal S115 as well as the U signal S116 and the V signal S117 which are also supplied from the image-quality adjustment circuit 115, as a luminance signal S118, a U signal S119, and a V signal S120, respectively. Further, in the period during which the sub-screen is displayed, the main/sub switching circuit 116a extracts the luminance signal S115 corresponding to the sub-screen from the image-quality adjustment circuit 115, and outputs the extracted luminance signal S115 as well as the U signal S111 and the V signal S112 which are supplied from the division circuit 113, as a luminance signal S118, a U signal S119, and a V signal S120, respectively. By switching the input signal in this way, the luminance signal S118, U signal S119, and V signal S120, in which the sub-screen video signal is inserted in the main-screen video signal, are outputted.

Next, the operation of the video signal processing apparatus will be described. In the following description, the operations of the same constituents as those described for the first embodiment will be omitted.

The main/sub switching circuit 116a selects either the main-screen luminance signal included in the luminance signal S115, U signal S116, and V signal S117, or the sub-screen luminance signal included in the luminance signal S115, U signal S111, and V signal S112 on the basis of the main/sub switching signal S142, thereby obtaining the luminance signal S118, U signal S119, and V signal S120, in which the sub-screen signal is inserted in the main screen signal. Since the luminance signal S115 has been subjected to image-quality adjustment by the image-quality adjustment circuit 115, both of the main-screen luminance signal and the sub-screen luminance signal, which are extracted from this luminance signal S115, have also been subjected to image-quality adjustment. Consequently, the sub-screen video signal is also subjected to image-quality adjustment, and an image of satisfactory quality is displayed on the sub-screen.

In this second embodiment, the luminance signal and color-difference signals for the main screen as well as the luminance signal for the sub-screen are eventually extracted from the luminance signal S104 obtained through the YC separation circuit 105, by using the main/sub switching circuit 116a. Since the YC separation circuit 105 is provided with the line comb filter as already described for the first embodiment, the main-screen luminance signal and color-difference signals and the sub-screen luminance signal, which are outputted from the YC separation circuit 105, are delayed by one line period with respect to the sub-screen U signal and V signal which are not transmitted through the YC separation circuit 105. Accordingly, when the sub-screen processing circuit described for the first embodiment is employed, such delay causes a deviation of a reference line between the main screen and the sub-screen, and a satisfactory—image cannot be obtained.

In order to solve this problem, in a sub-screen signal processing circuit 146a according to the second embodiment, the sub-screen luminance signal S133, U signal S134, and V signal S135 are read from the memory 124 to the YUV delay difference control circuit 126, and the YUV delay difference control circuit 126 delays the U signal S134 and the Y signal S135 by one horizontal period with respect to the luminance signal S133, and outputs a luminance signal S136 as well as a U signal S137 and a V signal S138 each having a delay difference of one horizontal period with respect to the luminance signal S136, to the D/A converters 127, 128, and 129. Since, in the YC separation circuit 105, the main-screen video signal S01 and the sub-screen luminance output signal S139 are delayed by one line period and outputted, the delay between the main-screen video signal S101 and the sub-screen luminance output signal S139, and the sub-screen U output signal S140 and the sub-screen V output signal S141 can be canceled. Further, YUV delay control may be carried out-by setting a difference in read timings from the memory, instead of providing the YUV delay difference control circuit 126.

As described above, according to the second embodiment, the same effects as those described for the first embodiment can be achieved, and furthermore, a sub-screen image of satisfactory quality can be obtained by subjecting the sub-screen video signal to image-quality adjustment.

Furthermore, since a signal delay difference equivalent to one line is set between the sub-screen luminance signal and each of the sub-screen U and V signals by using the YUV delay difference control circuit 126 included in the sub-screen signal processing circuit 146a, it is possible to cancel a delay of one horizontal period, of the main-screen video signal and the sub-screen luminance signal with respect to the sub-screen U and V signals, which delay occurs in the YC separation circuit 105 having the line comb filter and included in the main-screen signal processing circuit 147a, whereby a deviation of the reference line at the change point between the main screen and the sub-screen is avoided, resulting in an image of satisfactory quality.

[Embodiment 3]

Figure 2:
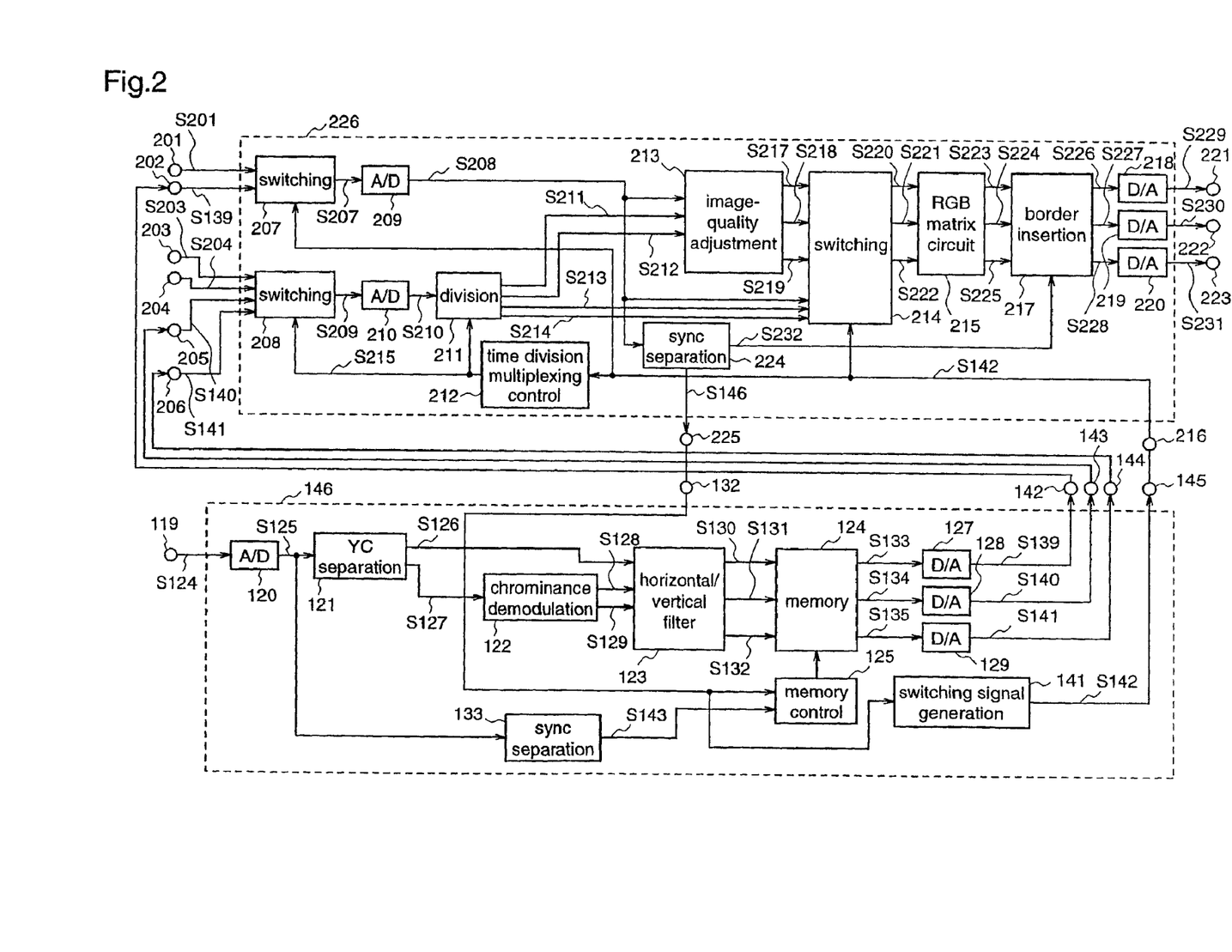
FIG. 2 is a block diagram illustrating the construction of a video signal processing apparatus according to a third embodiment of the present invention.

FIG. 2 is a block diagram illustrating the construction of a video signal processing apparatus according to a third embodiment of the present invention. This video signal processing circuit is fundamentally identical to the video signal processing apparatus according to the first embodiment except that YUV separated component signals are inputted to a main-screen signal processing circuit.

In FIG. 2, the same reference numerals as those shown in FIG. 1 denote the same or corresponding parts. In a main-screen signal processing circuit 226, a main-screen luminance signal S201, which is one of the component signals, is inputted to an input terminal 201, and a sub-screen luminance output signal S139 is inputted to an input terminal 202. A switching circuit 207 selects either the main-screen luminance signal S201 or the sub-screen luminance output signal S139 according to a main/sub switching signal S142, and outputs the selected signal. For example, the switching circuit 207 outputs the sub-screen luminance output signal S139 as a composite luminance signal S207 when the main/sub switching signal S142 is "High", and outputs the main-screen luminance signal S201 as a composite luminance signal S207 when the main/sub switching signal S142 is "Low". An A/D converter 209 converts the analog composite luminance signal S207 into a digital composite luminance signal S208, and outputs it to a synchronous separation circuit 224, an image-quality adjustment circuit 213, and a main/sub switching circuit 214. The synchronous separation circuit 224 separates a horizontal sync signal and a vertical sync signal from the composite luminance signal S208, generates a horizontal/vertical reference pulse S146 that is synchronized with the main-screen luminance signal, and outputs the pulse S146 from an output terminal 225.

An input terminal 203 is supplied with a main-screen U signal S203 that is one of the component signals, and an input terminal 204 is supplied with a main-screen V signal S204 that is one of the component signals. Further, an input terminal 205 is supplied with a sub-screen U output signal S140, and an input terminal 206 is supplied with a sub-screen V output signal S141. A time-division multiplexing control circuit 212 generates a multiplexing switching signal S215 on the basis of the main/sub switching signal S142. A switching circuit 208 selects one of the input terminals 203~206 on the basis of the multiplexing switching signal S215, and outputs it as a composite video signal S209. An A/D converter 210 converts the analog composite video signal S209 into a digital composite video signal S210. A division circuit 211 divides the composite video signal S210 into a main-screen U signal S211, a main-screen V signal S212, a sub-screen U signal S213, and a sub-screen V signal S214, on the basis of the multiplexing switching signal S215. The composite luminance signal S208, the main-screen U signal S211, and the main-screen V signal S212 are inputted to the image quality adjustment circuit 213, wherein the inputted signals are subjected to digital processing for adjusting the image quality, and consequently, image-quality-adjusted luminance signal S217, U signal S218, and V signal S219 are obtained. As an example of image-quality adjustment performed by the image-quality adjustment circuit 213, there is outline correction for enhancing an outline portion of the image. In the period during which the main screen is displayed, the main/sub switching circuit 214 extracts the luminance signal S217 corresponding to the main screen from the image-quality adjustment circuit 213, on the basis of the main/sub switching signal S142, and outputs the extracted luminance signal S217 as well as the U signal S218 and V signal S219 which are also outputted from the image-quality adjustment circuit 213, as a luminance signal S220, a U signal S221, and a V signal S222, respectively. On the other hand, in the period during which the sub-screen is displayed, the main/sub switching circuit 214 extracts the sub-screen luminance signal from the video signal S208 that is directly outputted from the A/D converter 209, and outputs this luminance signal, and the U signal S213 and V signal S214 which are outputted from the division circuit 211, as a luminance signal S220, a U signal S221, and a V signal S222, respectively. By switching the input signal in this way, the luminance signal S220, U signal S221, and V signal S222, in which the sub-screen video signal is inserted in the main-screen video signal, are outputted. The luminance signal S220, U signal S221, and V signal S222 are converted into R, G, B signals by an RGB matrix circuit 215, and outputted as an R signal S223, a G signal S224, and a B signal S225. At the boundary of the main-screen video signal and the sub-screen video signal, there is no correlation between upper and lower lines or left and right lines of the main screen because the sub-screen is inserted by switching. When the main-screen image quality adjustment circuit 213 has performed outline correction with reference to the correlation between the lines or outline correction in the horizontal direction, an arithmetic error might occur at the boundary because there is no correlation between the main-screen video signal and the sub-screen video signal. In this third embodiment, however, the border insertion circuit 217 inserts a border line in the position of the boundary of the main screen and the sub-screen according to the horizontal/vertical synchronous reference pulse S232, whereby an R signal S226, a G signal S227, and a B signal S228, in which image disordering due to an arithmetic error at the boundary is resolved, are obtained. D/A converters 218, 219, and 220 convert the digital R signal S226, G signal S227, and B signal S228 into analog signals, and output an R output signal S229, a G output signal S230, and a B output signal S231 from output terminals 221, 222, and 223, respectively.

Figure 6:
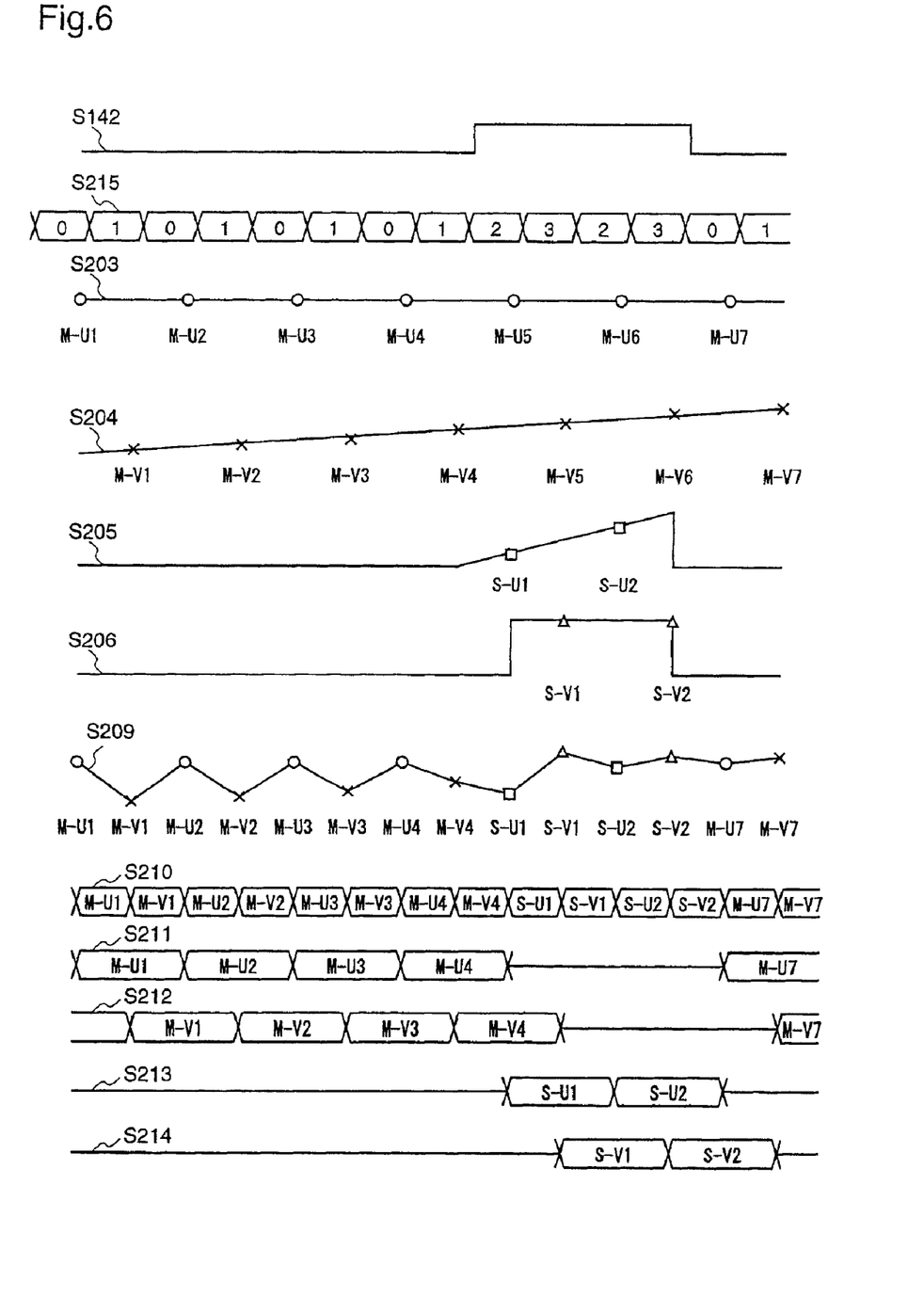
FIG. 6 is a timing chart of a chrominance signal before and after time-division multiplexing by the video signal processing apparatus according to the third embodiment.

FIG. 6 is a timing chart for explaining the case where main-screen color-difference signals and sub-screen color-difference signals are time-division-multiplexed to be inputted to an A/D converter. In FIG. 6, S142 denotes a main/sub switching signal, S215 denotes a switching signal for color-difference signal multiplexing, S203 denotes a main-screen U signal input, S204 denotes a main-screen V signal input, S205 denotes a sub-screen U signal output, S206 denotes a sub-screen V signal output, S209 denotes a time-division-multiplexed video signal, S210 denotes an A/D converted digital video signal, S211 denotes a separated main-screen U signal, S212 denotes a separated main-screen V signal, S213 denotes a separated sub-screen U signal, and S214 denotes a separated sub-screen V signal. In FIG. 6, crosses, circles, triangles, and rectangles denote sampling points, M-U denotes a U signal of the main-screen video signal, M-V denotes a V signal of the main-screen video signal, S-U denotes a U signal output of the sub-screen video signal, S-V denotes a V signal output of the sub-screen video signal, and numerals that follow U and V denote the respective sampling points. Since the sub-screen U signal output S205 and the sub-screen V signal output S206 are subjected to sampling by the same A/D converter 112, the sampling points of the signal S205 and the sampling points of the signal S206 are alternately arranged.

Hereinafter, a description will be given of the operation of the video signal processing apparatus constructed as described above. Since the circuit structure of the sub-screen signal processing circuit 146 is identical to that described for the first embodiment, repeated description is not necessary.

It is assumed that the main-screen luminance signal S201 is inputted to the input terminal 201, the sub-screen luminance output signal S139 is inputted to the input terminal 202, and the sub-screen video signal is inputted to the switching circuit 207 during the "High" period of the main/sub switching signal S142. Then, the sub-screen luminance output signal S139 is outputted as a composite luminance signal S207 when the sub-screen video signal is inputted, and the main-screen luminance signal S201 is outputted as a composite luminance signal S207 when the sub-screen signal is not inputted. The analog composite luminance signal S207 is converted into a digital composite luminance signal S208 by the A/D converter 209, and the composite luminance signal S208 is inputted to the synchronous separation circuit 224, the image-quality adjustment circuit 213, and the main/sub switching circuit 214. The synchronous separation circuit 224 separates horizontal and vertical sync signals from the composite video signal S208 to generate a horizontal/vertical reference pulse S232 and a horizontal/vertical reference pulse S146 which are synchronized with the main-screen input signal. Then, the synchronous separation circuit 224 outputs the horizontal/vertical reference pulse S232 to the border insertion circuit 217, and outputs the horizontal/vertical reference pulse S146 through the output terminal 225 to the sub-screen signal processing circuit 146.

The switching circuit 208 receives the main-screen U signal S203 inputted to the input terminal 203, the main-screen V signal S204 inputted to the input terminal 204, the sub-screen U output signal S140 inputted to the input terminal 205, and the sub-screen V output signal S141 inputted to the input terminal 206. The time-division multiplexing control circuit 212 generates a multiplexing switching signal S215 as shown in FIG. 6 on the basis of the main/sub switching signal S142. The switching circuit 208 selects the main-screen U signal S203 when the multiplexing switching signal S215 is "0", selects the main-screen V signal S204 when the signal S215 is "1", selects the sub-screen U output signal S205 when the signal S215 is "2", and selects the sub-screen V signal S206 when the signal S215 is "3", thereby obtaining a composite video signal S209 that is an analog signal. The analog composite video signal S209 is converted into a digital composite video signal S210 by the A/D converter 210. The division circuit 211 divides the composite video signal S210 into a main-screen U signal S211, a main-screen V signal S212, a sub-screen U signal S213, and a sub-screen V signal S214. The main-screen U signal S211 and the main-screen V signal S212 are inputted to the image-quality adjustment circuit 213. The image-quality adjustment circuit 213 performs digital processing for image-quality adjustment on the composite luminance signal S208, the main-screen U signal S211, and the main-screen V signal S212. As an example of digital processing, there is outline correction for enhancing the outline. Thereby, image-quality-adjusted luminance signal S217, U signal S218, and V signal S219 are obtained. The main/sub switching circuit 214 selects either the main-screen luminance signal included in the luminance signal S217, and the main-screen U signal S218 and V signal S219, or the sub-screen luminance signal included in the composite luminance signal S208, and the sub-screen U signal S213 and V signal S214, according to the main/sub switching signal S142, thereby obtaining a luminance signal S220, a U signal S221, and a V signal S222, in which the sub-screen signal is inserted in the main-screen signal. The luminance signal S220, the U signal S221, and the V signal S222 are converted into R, G, B signals by the RGB matrix circuit 215, thereby obtaining an R signal S223, a G signal S224, and a B signal S225. At the boundary of the main-screen video signal and the sub-screen video signal, there is no correlation between upper and lower lines or left and right lines of the main screen because the sub-screen is inserted by switching. When the main-screen image quality adjustment circuit 213 has performed outline correction with reference to the correlation between the lines or outline correction in the horizontal direction, an arithmetic error might occur at the boundary because there is no correlation between the main-screen video signal and the sub-screen video signal. Therefore, the border insertion circuit 217 inserts a border line in the position of the boundary of the main screen and the sub-screen according to the horizontal/vertical synchronous reference pulse S232, whereby an R signal S226, a G signal S227, and a B signal S228, in which image disordering due to an arithmetic error at the boundary is resolved, are obtained. These digital R signal S226, G signal S227, and B signal S228 are converted into analog signals by the D/A converters 218, 219, and 220, whereby an R output signal S229, a G output signal S230, and a B output signal S231 are outputted from the output terminals 221, 222, and 223, respectively.

As described above, according to the third embodiment of the invention, the main-screen signal processing circuit has the respective input terminals for the main-screen luminance signal, U signal, and V signal, and the luminance signal, U signal, and V signal are subjected to digital processing. Therefore, the same effects as described for the first embodiment can be achieved even when the component video signals are inputted.

In this third embodiment, the main/sub switching circuit 214 extracts the sub-screen luminance signal from the composite luminance signal S208 outputted from the A/D converter 209. In the present invention, however, when the composite luminance signal S208 outputted from the A/D converter 209 is not directly inputted to the main/sub switching circuit 214, the main/sub switching circuit 214 may extract the sub-screen luminance signal from the luminance signal S213 outputted from the image-quality adjustment circuit 213. In this case, the image-quality-adjusted luminance signal can be used as the sub-screen luminance signal, whereby an image of higher quality can be obtained.

Furthermore, while the first to third embodiments of the invention have been described for the case where one sub-screen is displayed in one main screen, the present invention is also applicable to the case where plural sub-screens are displayed in one main screen, with the same effects as mentioned above.

What is claimed is:
1. A video signal processing apparatus comprising:
a sub-screen processing integrated circuit for receiving a video signal for a sub-screen, and subjecting the sub-screen video signal to scale-down processing to reduce its display region and output the scaled-down sub-screen video signal; and
a main-screen processing integrated circuit including:
a switching means for receiving a video signal for a main-screen and the scaled-down sub-screen video signal which is outputted from the sub-screen processing integrated circuit, and selecting the main-screen video signal for a main-screen display region while selecting the scaled-down sub-screen video signal for a sub-screen display region;

an analog-to-digital conversion means for converting the video signal which is outputted from the switching means into a digital video signal;

a digital signal processing means for digitally processing the digital video signal which is outputted from the analog-to-digital conversion means; and a digital-to-analog conversion means for converting the digitally-processed video signal into an analog video signal.

2. A video signal processing apparatus as defined in claim 1, wherein said digital signal processing means includes a border insertion means for inserting a border line of a predetermined width at the boundary of the main-screen display region and the sub-screen display region.

3. A video signal processing apparatus as defined in claim 2, wherein said border insertion means inserts the border line in accordance with a control signal for controlling the switching means.

4. A video signal processing apparatus as defined in claim 1, wherein the main-screen video signal is inputted to an S terminal with a luminance signal and a chrominance signal thereof being inputted to said S terminal separately.

5. A video signal processing apparatus as defined in claim 1, wherein signals to be inputted to the main-screen processing integrated circuit are three component video signals comprising a luminance signal and two color-difference signals, respectively.

6. A video signal processing apparatus as defined in claim 1, wherein said digital signal processing means includes an image-quality adjustment means for performing image processing on the inputted digital video signal.

7. A video signal processing apparatus as defined in claim 1, wherein said sub-screen processing integrated circuit further includes a delay difference control means for delaying color-difference signals of the sub-screen video signal with respect to a luminance signal of the sub-screen video signal to output the delayed signals to the main-screen processing integrated circuit.

8. A video signal processing apparatus as defined in claim 7, wherein in the main-screen processing integrated circuit, the digital signal processing means includes a YC separation means for performing, using a line memory, YC separation on video data of a target line to be processed, by an arithmetic operation which is based on the target line outputted from the analog digital conversion means and two lines positioned before and after the target line; and said delay difference control means delays the color-difference signals of the sub-screen video signal by one line period with respect to the sub-screen luminance signal, in accordance with a one-line delay that occurs in the YC separation means.

9. A video signal processing apparatus comprising:

a sub-screen processing integrated circuit for receiving a video signal for a sub-screen, and subjecting the sub-screen video signal to scale-down processing to reduce its display region and output the scaled-down sub-screen video signal; and a main-screen processing integrated circuit including:

a switching means for receiving a video signal for a main-screen and the scaled-down sub-screen video signal which is outputted from the sub-screen processing integrated circuit, and selecting the main-screen video signal for a main-screen display region while selecting the scaled-down sub-screen video signal for a sub-screen display region; and a border insertion means for receiving the output from the switching means, and inserting a border line of a predetermined width at the boundary of the main-screen display region and the sub-screen display region.

* * * * *